Jan. 12, 1971  R. HINDS  3,553,951
TENSION REGULATED WRAPPING MACHINE
Filed Oct. 10, 1967  6 Sheets-Sheet 1

Inventor
RONALD HINDS
By
Webb, Burden, Robinson & Webb
Attorneys

United States Patent Office 3,553,951
Patented Jan. 12, 1971

3,553,951
TENSION REGULATED WRAPPING MACHINE
Ronald Hinds, Woolton, England, assignor to British Insulated Callender's Cables Limited, London, England
Filed Oct. 10, 1967, Ser. No. 674,291
Claims priority, application Great Britain, Sept. 30, 1966, 43,724/66; Nov. 29, 1966, 53,419/66
Int. Cl. B65h 81/06
U.S. Cl. 57—3                 11 Claims

ABSTRACT OF THE DISCLOSURE

Apparatus for controlling the tension in flexible material, for example material being unwound from a supply drum, and especially material being unwound from the supply drum of a lapping head which helically laps the material onto a moving core passing through the head. A braking force for application directly to the flexible material or to the supply drum is generated in a servomechanism incorporating a lever the ratio of which is varied by relative movement along the lever between its fulcrum and its input and/or output points under the action of sensing member responsible to the tension in the material.

---

Figure 1:
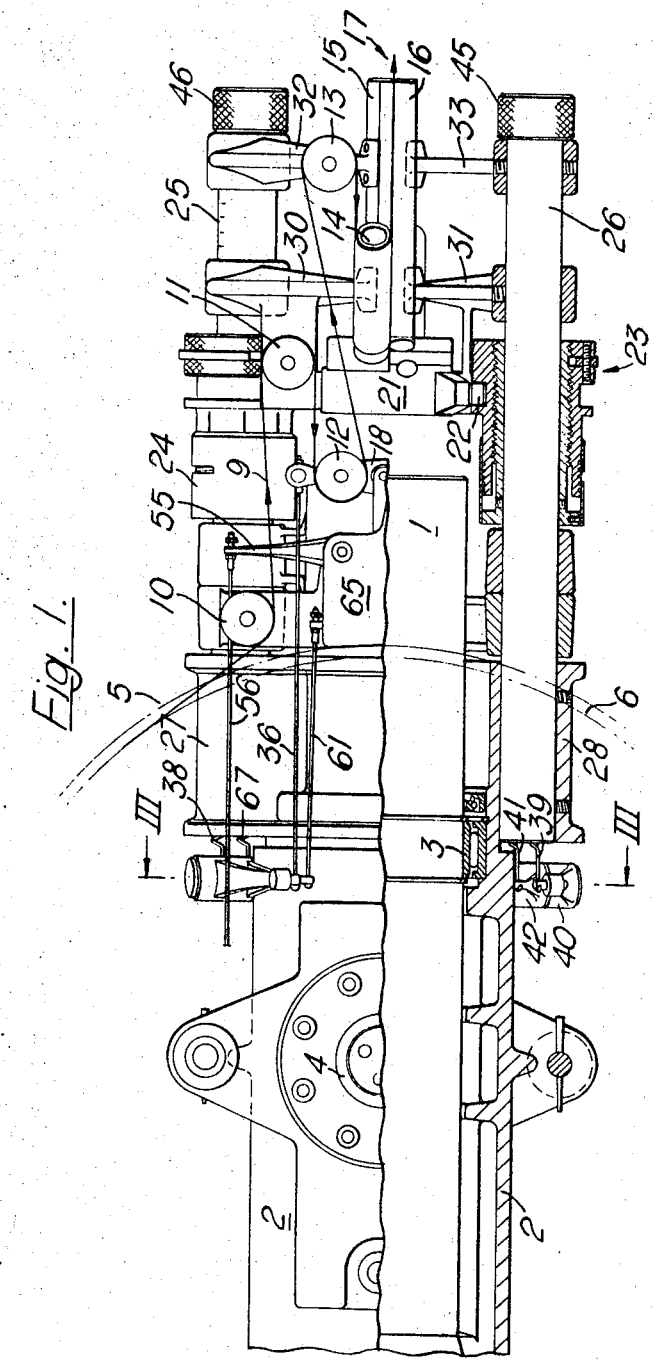

This invention relates to tension control apparatus incorporating a servomechanism especially, but not exclusively, suitable for controlling the tension in elongated flexible material passing from a supply drum to a longitudinally moving core, onto which the material is being helically lapped.

An object of the invention is to provide apparatus in which the magnitude of a servo force used for braking the flexible material is mechanically controlled by changes in the position of a sensing member responsive to the tension in the flexible material and in which the reaction on the sensing member both of the servo force and of a force by which it is generated is kept to a minimum. Another object of the invention is to provide apparatus which is suitable for mounting on a lapping head in such a way that centrifugal forces generated by rotation of the lapping head have little effect on the functioning of the sensing device and servomechanism.

In the apparatus in accordance with the invention, a variable braking force for application to elongated flexible material, the tension of which is to be controlled, is generated at a point spaced from the fulcrum of a lever (hereinafter referred to as the "output point") by applying a force to another point on the lever also spaced from the fulcrum (hereinafter referred to as the "input point") and the magnitude of the braking force is varied by changing the ratio of the lever by relative movement, under the action of a sensing member responsive to the tension in the flexible material, between the fulcrum and at least one of the points defined above as the input point and output point, the direction of such relative movement being substantially along or parallel to the effective axis of the or each arm of the lever.

The force applied to the input point of the lever may be substantially constant but may vary, in response to movement of the sensing member, to increase the sensitivity of the system. It is preferably derived from a substantially constant force transmitted through means by which it is varied under the action of the sensing member in inverse ratio to the tension in the material.

The sensing member may for example be a dancer pulley around which a loop of an elongated flexible member passes in its path from a supply drum to a takeup device and the braking force generated at the output point of the lever may be applied to a brake for the supply drum by a coupling member linking the lever to the brake shoe.

When the lever is a simple straight lever of the first class adapted to rock about a roller which forms its fulcrum, a substantially constant force can be applied to one end of the lever, the input point, for example through a linkage pivoted at the end of the lever, and the servo braking force transmitted from the other end of the lever, the output point, for example through another linkage pivotally connected to that end of the lever. With such an arrangement, the ratio of the lever is varied, to vary the servo force, by moving the roller which forms the fulcrum along the lever under the action of the tension sensing member, which by its changing position provides the input signal of the servomechanism. Changes in tension in the flexible material can then be arranged to cause the fulcrum to move along the lever in such a direction that a braking force applied to the material, e.g., via a drum from which it is being unwound, is varied to restore the tension in the material to an optimum value. This entails applying a substantially constant force to the dancer pulley or other sensing member opposing the reaction of the tension in the flexible material.

Under normal conditions when the material moves at a constant linear speed from a supply drum, the fulcrum will move progressively along the lever in a direction progressively to decrease the braking force applied to the drum as the amount of material wound on the drum diminishes to keep the braking torque substantially equal to the torque applied to the drum by the flexible member.

We prefer however to vary the ratio of the lever by maintaining the fulcrum stationary and moving the input and/or output points of the lever relative to the fulcrum. The movable input or output point or each of them is preferably the point of contact between a roller and the lever, through which roller or rollers the generating force is applied and/or the servo force transmitted. A cranked lever is preferred and the roller moved by the sensing member along a straight arm of the or each crank towards and away from the fulcrum to change the ratio of the lever. When the ratio of the lever is changed by moving only the input point relatively to the fulcrum, the input force is preferably generated by a second lever having a constant input torque and whose ratio is varied in the same sense as that of the first lever.

Figure 2:
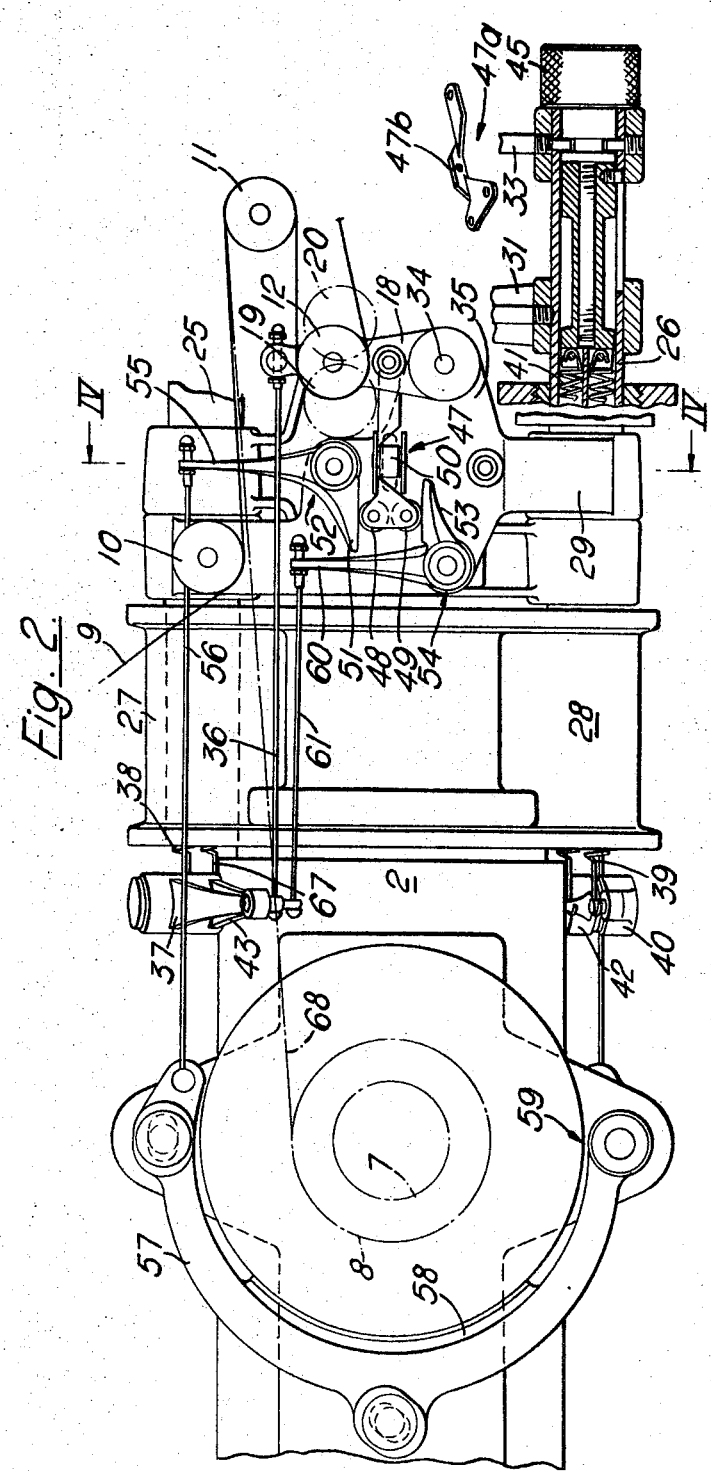
Figure 3:
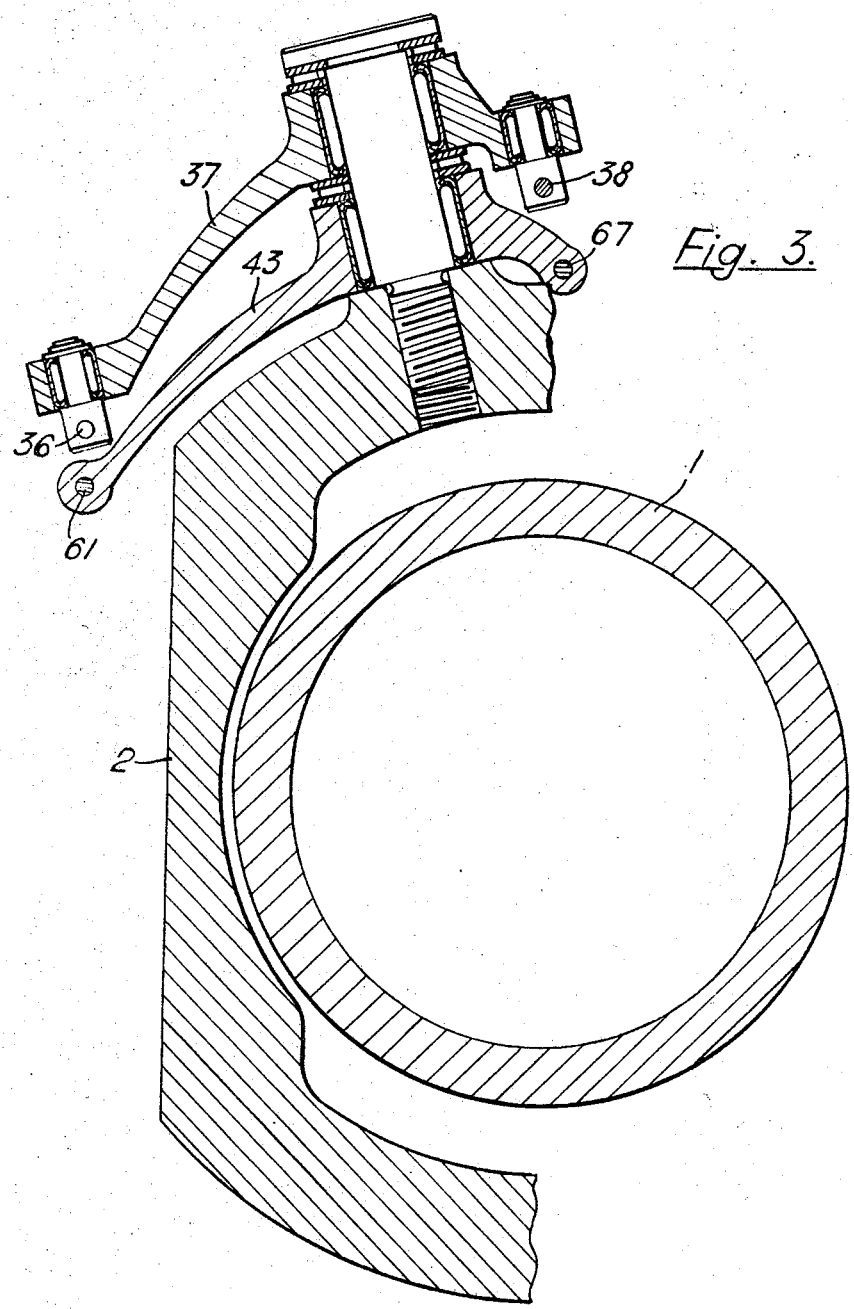
Figure 4:
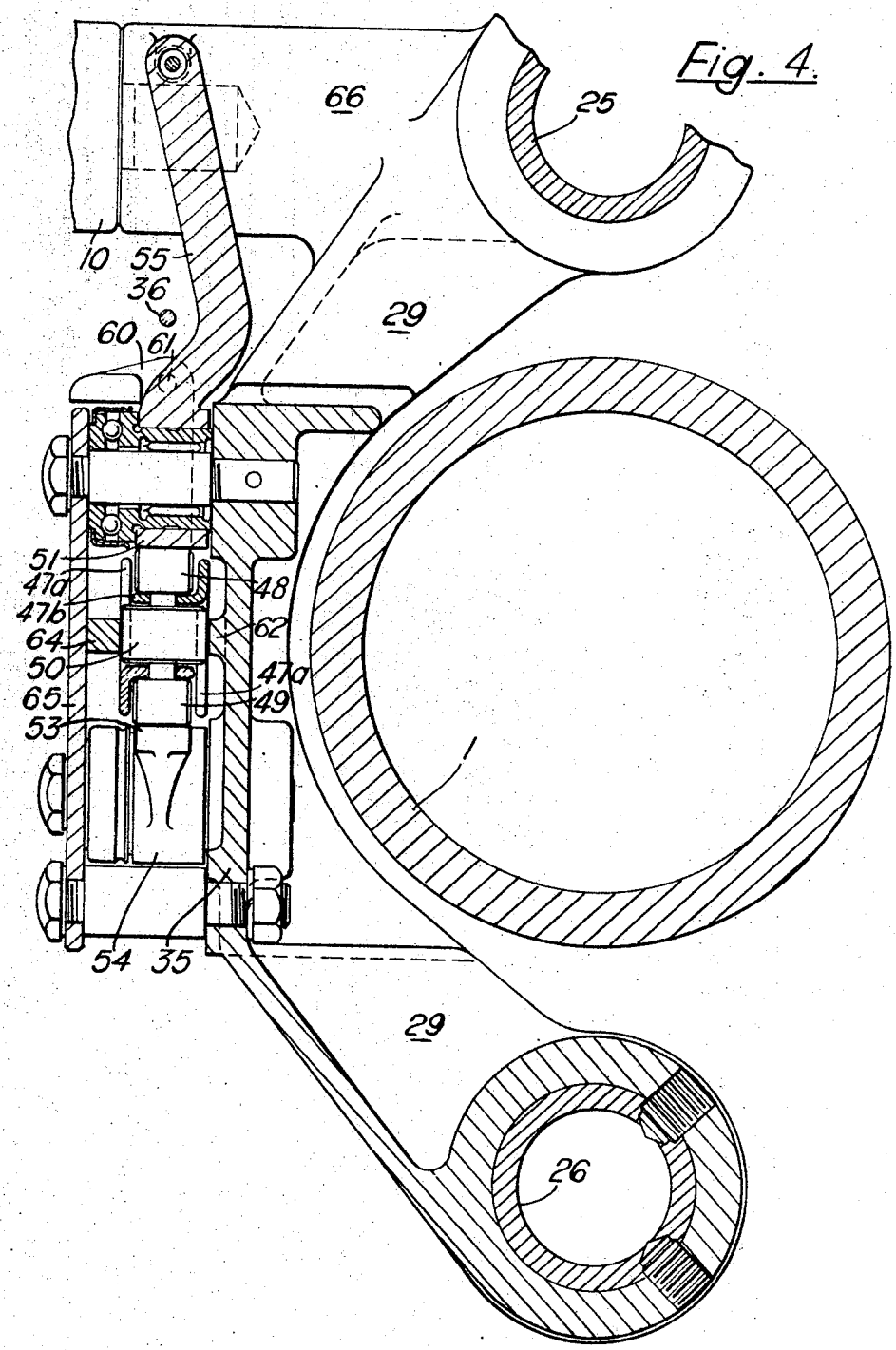
Figure 5:
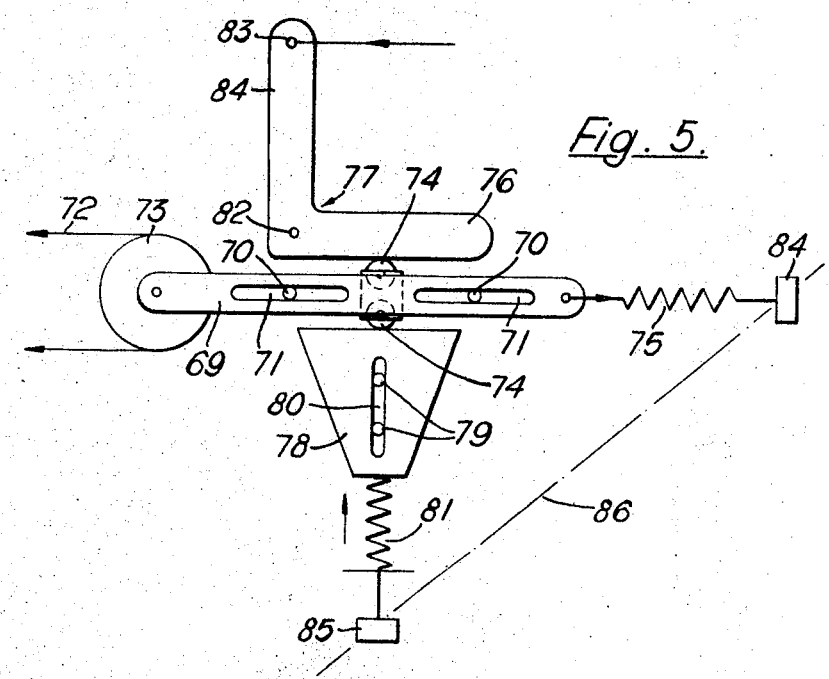
Figure 6:
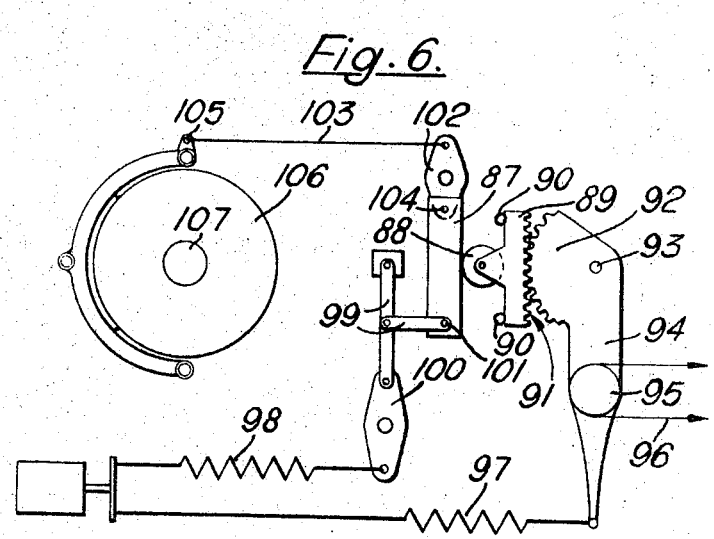
Figure 7:
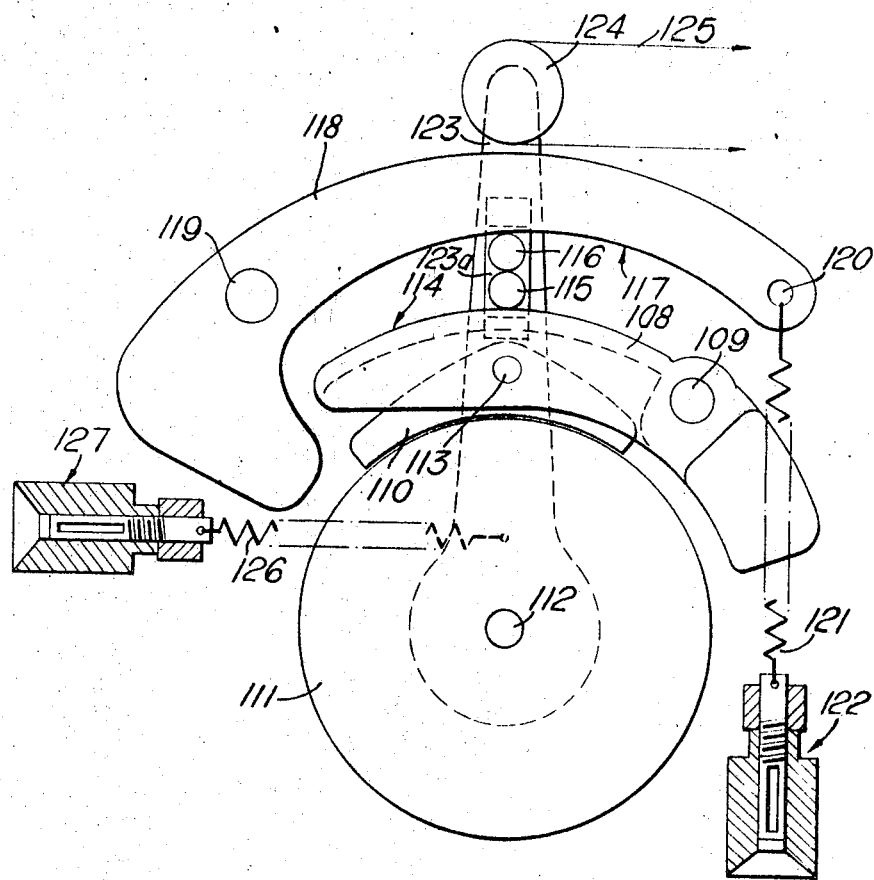

The invention will be further understood from the following description with reference to the accompanying drawings of examples of tension control apparatus and of a lapping head in accordance with the invention. In the drawings:

FIG. 1 is an elevation partly in vertical section of the lapping head,

FIG. 2 is an elevation, also partly in vertical section and on a larger scale, of part of the lapping head shown in FIG. 1 to shown the tension control means in greater detail, FIGS. 3 and 4 are enlarged part sectional elevations of parts of the mechanism shown in FIG. 2, on lines III—III and IV—IV respectively, and FIGS. 5, 6 and 7 are diagrammatic drawings of alternative forms of tension control apparatus in accordance with the invention.

Referring to FIG. 1, the lapping head is designed for simultaneously applying two paper tapes to a cable core and rotates about a fixed horizontal tube 1 through which the cable core (not shown) passes coaxially from left to right, as seen in FIG. 1. The lapping head itself is based on a tubular body 2 which is rotated by a mechanism not shown around the tube 1 and is carried on the tube 1 by appropriate bearings, including the bearing 3.

The paper tape is supplied from two pads mounted one on each side of the head with their axes perpendicular to and passing through the axis of the tube 1, about which the head rotates. The tubular spindle on which a drum for one of these pads is mounted is shown at 4 in FIG. 1. The outer circumference of the pad support is shown chain dotted at 5 in FIG. 1 and the maximum diameter of the pad is shown chain dotted at 6. The drum of the pad support is shown chain dotted at 7 in FIG. 2 and the outer diameter of a nearly exhausted pad at 8. It will be seen thaat from the full pad, paper tape 9 passes over a first guide roller 10, a second guide roller 11, a third guide roller 12 (which will hereinafter be referred to as the "dancer" roller), a fourth guide roller 13, an angled guide pin 14 and from the guide pin 14 between parallel guides 15 and 16 onto the cable core in the direction of the arrow 17. The guide rollers 10, 11 and 13 are free to rotate about spindles which are fixed with respect to the head, the dancer roller 12 is free to rotate about a spindle mounted on a lever 18 between chain dotted positions 19 and 20 shown in FIG. 2, the guide pin 14 is adjustably mounted with respect to the head, and the guides 15 and 16 are fixed with respect to the head.

The angled pin 14 is mounted on a support 21 which can rock about a spindle to adjust the angle of approach of the tape 9 to the cable core. This movement is controlled by a roller 22 running in a circumferential groove in a vernier type adjusting member 23. A similar adjusting member 24 is provided for an angled pin for guiding the other tape onto the cable core on the opposite side of the head.

Two tubes 25 and 27 projecting from sockets 27 and 28 integral with the tubular body 2 are used as structural members for supporting the vernier members 23 and 24 and bridge pieces carrying a servomechanism and the guide rollers for the tapes, for example bridge piece 29 (FIG. 4) carrying a servomechanism hereinafter to be described and pairs of bridge pieces 30 and 31 and 32 and 33 (FIG. 1) carrying the guides 15 and 16, the first pair of which also carry the support 21 for the angled guide 14. The tubes 25 and 26 also act as casings for tension springs hereinafter to be described.

Referring now to FIGS. 2 and 4 the lever 18, which carries the dancer roller 12 is pivoted at 34 to a back plate 35, forming part of the bridge piece 29, in such a way that an increase in tension in the tape 9 causes the lever 18 to rotate in a clockwise direction and a reduction in the tension in the tape allows it to rotate in an anticlockwise direction under the action of a biasing force applied to it through a rod 36 lying parallel to the axis of the head. At its opposite end the rod 36 is pivoted to one end of a lever 37 which at its other end is coupled to a tension spring 38 mounted in the tube 25.

The head carries two identical servomechanisms, one for each paper pad, and a tube 26, which is identical to the tube 25, incorporates similar springs for the servomechanism on the opposite side of the head to that shown in FIG. 2. It will be seen that there are two tension springs in the tube 26 one of them, 39, being provided for biasing a lever 40, equivalent to the lever 37, and another 41 for biasing a lever 42 mounted on the same pivot as the lever 40. Similarly, a second lever 43 is mounted on the same pivot 44 as the lever 37. The levers 40 and 42 are seen more clearly in FIG. 3 which is a part sectional elevation in the plane of the levers 37 and 43.

The tensions in the two springs 39 and 41 within the tube 26 are simultaneously adjustable by rotation of a hand knob 45. A similar hand knob 46 is provided for adjusting the tensions in the two springs mounted within the tube casing 25.

A tension sensing member 47 built up from two identical parts 47a, the shape of which is shown in the perspective inset to FIG. 2, is pivotally coupled to the lever 18 and carries at its opposite end a pair of freely mounted rollers 48 and 49. A third roller 50 is mounted between flanges 47b of the identical members 47a. The roller 48 runs on an arm 51 of a first bell-crank lever 52 and the roller 49 runs on an arm 53 of a second bell-crank lever 54, parallel to the arm 51. The other arm 55 of the bell-crank lever 52 is coupled by a rod 56 to an operating lever 57 of a brake for the pad support, consisting of a brake shoe 58 acting on a brake drum 59. The second arm 60 of the bell-crank lever 54 is coupled by a rod 61, lying parallel to the axis of the head, to the lever 43 already referred to. The roller device constituted by the left-hand end of the sensing device 47 and the two rollers 48 and 49 transmit the output force of the second lever 54 to the input point of first lever 52, which point is the point of contact between the roller 48 and the arm 51 of the lever 52.

Referring to FIG. 4, which is a part vertical section taken through the centre line of the pivot of the lever 52, it will be seen that the roller 50 of the sensing member 47 runs between a rib 62 formed on the plate 35 which forms the back wall of a casing for the servomechanism and a longitudinal runner 64 mounted on a lid 65 for the casing. In FIGS. 1 and 4 the lid 65 is shown in situ on the casing whereas in FIG. 2 it is not shown. In FIG. 4 one of the guide rollers 10 for the paper tape can also be seen and it will be noted that the rod 56 passes through a hole in a support 66 for the roller 10, which support projects from the bridge piece 29.

The spring 38 and a spring 67 attached to the lever 43, both mounted in the tube 25, are designed to apply a substantially constant force to the arm 60 of the second bell-crank lever 54 and to the dancer lever 18 within the normal range of movement of those levers. As tension increases in the tape 9, the dancer roller 12 will be moved against the biasing spring 38 towards its limiting position 20 shown in FIG. 2, thus moving the sensing member 47 to the right, increasing the effective length of the arm 53 of the bell-crank lever 54 and decreasing the effective length of the arm 51 of the bell-crank lever 52. This will lead to a decrease in the braking force applied to the pad from which the tape 9 is being withdrawn and allow the tension to be restored to normal. Similarly, a decrease in tension of the tape 9 will allow the dancer roller 12 to move towards its limiting position 19 shown in FIG. 2, with a consequent increase of the braking torque applied to the pad support. Since the lengths of the input arm 60 of the lever 54 and the output arm 55 of the lever 52 remain constant, movement of the sensing device to the left decreases the ratio of both levers and its movement to the right increases the ratio of both levers. In other words the ratios of the levers change in the same sense and preferably, although not necessarily, at the same rate.

The functioning of the tension control system will not be substantially affected by changes in centrifugal force on its components due to variations in the speed of rotation of the lapping. Under the centrifugal force the roller 30 of the sensing member will be pressed against the member 64 carried on the lid 65. As the diameter of the coil of tape in the pad diminishes to that indicated at 8 in FIG. 2 the tape adopts a path 68 (shown dotted in FIG. 2) in which it passes directly to the roller guide 11.

The tension control system decribed with reference to FIGS. 2 and 4 is especially suitable for use in the manner shown in a tape lapping head but could also be used for controlling the tension in other flexible material being unwound from a supply drum not mounted on a lapping head.

The use of bell-crank levers for generating both the input force and the output (servo) force has the advantage that the servomechanism can be made both compact and sensitive. This arrangement is especially suitable for tension control systems for mounting on rotating machinery because it enables the direction of movement of the sensing member, the direction of application of the biasing force to the sensing member, and the directions of the input and output forces all to be made parallel to the same axis—the axis about which the apparatus is rotated, thus minimising the effect of centrifugal force on the functioning of the system.

Also, the fact that the input force and the biasing force for the sensing member are applied in the same direction makes it possible, as described with reference to FIGS. 1–4, to use a single adjusting member for springs generating these forces so that the system can readily be preset for any desired tension.

When applied to a lapping head, the compactness of the tension control system facilitates mounting the tape pad or pads and associated mechanism a minimum distance from the axis of the head, thus reducing inertia.

In the tension control apparatus shown diagrammatically in FIG. 5, the sensing member is a straight bar 69 constrained by pins 70 running in slots 71 to move only along its longitudinal axis, under the influence of tension variation in flexible material 72 passing round a dancer pulley 73, and a pair of rollers 74 projecting from opposite surfaces of the bar 69 are mounted for simultaneous transverse movement only with respect to the bar 69 in such a way that the rollers 74 move with the bar but a force transverse to the bar applied to one roller is transmitted to the other roller. The tension in the material 72 is opposed by an adjustable biasing spring 75.

As the bar 69 moves along its axis, and roller 74 runs along a parallel surface of an arm 76 of a pivoted lever 77 the other roller 74 runs along a straight edge of a plate 78 which is constrained by pins 79 running in a slot 80 to move only in a direction perpendicular to the axis of the sensing bar 69, under the action of an adjustable compression spring 81 urging it towards the bar. Thus the roller 74 running on arm 76 of the lever 77 applies a substantially constant force to the arm 76 at a distance from the pivot 82 (the fulcrum) of the lever 77 varying in dependence on the position of the sensing bar 69. The braking force may be generated in any suitable way by the lever, for example through a link pivoted to a fixed point 83 on another arm 84 of the lever or to a fixed point on the arm 76 of the lever, if the lever is of the second class. Adjusting members 84 and 85 for the springs 75 and 81 are preferably coupled as indicated by the chain dotted line 86.

A mechanism such as that described with reference to FIG. 5 can be used in reverse, in other words the generating force is applied to a fixed point on the lever 77 and the servo force is derived from the roller 74 that does not run on the arm 76 of the lever. This latter roller may, for example, run along a surface of a member similar to the plate 78 and constrained always to lie parallel to the arm of the lever by which the generating force is applied and constrained to move only towards and away from that arm of the lever, while remaining parallel to it. The member may, for example, be a brake actuating member or brake shoe for applying a braking force to a supply drum for the elongated flexible material. The sensing bar will as before, carry, at one end, a dancing roller or pulley about which a loop of the flexible material passes and will be connected at the other end to a biasing spring exerting a constant force opposing the tension in the material.

Instead of being allowed to float between the arms of two levers (as in FIGS. 1–4) or being constrained to move only axially (as in FIG. 5), the sensing member or bar may be mounted on a single pivot pin lying parallel to the pivot of the lever or levers and projecting through a longitudinal slot in the member. In this way the member can move both rectilinearly along its axis and angularly about its pivot, and when it is acted upon by a single lever it can remain parallel both to the lever arm, as the lever rocks about its fulcrum, and to a pivoted member, e.g., a brake operating member, to which the servo force is directly applied by a roller carried on the sensing member. The axis of the pivot for the brake operating member would lie in the same plane as the axes of the pivots for the lever and the sensing member, i.e., a plane at right angles to the direction of movement of the sensing member.

FIG. 6 shows diagrammatically apparatus in which a lever of the first class constituted by a straight bar 87 is adapted to rock about a transverse roller 88 which forms its fulcrum. The roller is mounted at the centre of a straight, toothed rack 89 lying parallel to the lever and constrained to move in a rectilinear path parallel to the normal alignment of the lever by pins 90. The rack is toothed on the opposite side to that which faces the lever and which carries the fulcrum roller and the teeth 91 engage with a toothed quadrant 92 pivoted about a point 93 lying approximately on the perpendicular bisecting the lever 87. A radial arm 94 projecting from the quadrant 93 approximately at right angles to said perpendicular carries a dancer roller 95 about which a tape 96, the tension of which is to be controlled, is guided. The tape 96 passes over guide rollers (not shown) and the dancer roller 95 in a parallel loop lying generally perpendicular to the lever 87, the axis of the dancer roller being parallel to the axis of the fulcrum roller 88.

The reaction of the tension in the tape 96 on the arm 94 of the quadrant 92 is balanced by a biasing spring 97 designed to apply a substantially constant turning moment to the quadrant, opposing the turning moment on the quadrant generated by the tension in the tape 96. A second biasing spring 98 is pivotally coupled through a suitable linkage 99, 100 to one end of the lever 87 (at the input point 101) to apply a substantially constant force at that point, substantially at right angles to the line joining the point to the fulcrum. At the other end of the lever 87 another linkage 102 is coupled by a rod 103 to the lever (at the output point 104) and to the operating arm 105 of a friction brake acting as a brake drum 106 on the supply pad spindle 107.

In the apparatus shown diagrammatically in FIG. 7 there are two levers each provided with an arcuate surface acted upon by a roller device carried on the sensing member. The first lever 108 is pivoted about a fulcrum 109 and carries a brake shoe 110 acting on a brake drum 111 carried on the spindle 112 and attached to supply drum for flexible material, the tension of which is to be controlled.

The output point of the lever 108 is a point 113 to which the brake shoe 110 is pivoted and its input point is the point on its arcuate surface 114 with which a roller 115 of the roller device makes contact. A second roller 116 of the roller device makes contact with an arcuate surface 117 of a second lever 118 pivoted at 119.

A constant biasing force is applied to the lever 119 at a point 120 by a biasing spring 121, secured at its other end to a preset adjusting device 122.

The rollers 115 and 116 are mounted on a sliding member 123a carried by a sensing member 123, in such a way that the roller device constituted by the sliding member and the rollers 115 and 116 can move freely under the action of the two levers along an axis of the sensing device passing through a spindle about which it is freely pivoted, which spindle is coaxial with or is constituted by the spindle 112 carrying the supply drum.

The sensing member 123 carries a dancer pulley 124 about which a loop of the flexible material 125, the tension of which is to be controlled, passes. The action of the tension in the flexible material 125 on the sensing member 123 is opposed by a biasing spring 126 provided with preset adjusting means 127 similar to, and preferably coupled to, the adjusting means 122.

In all cases when the flexible member, the tension of which is to be controlled, is a member being applied to a core by a lapping head carrying a supply of the material, the servomechanism is preferably mounted on the lapping head in such a way that the arms of the or each layer lie on chords of a circle having its centre on the cable axis and its circumference lying on a plane including or forming a right angle with the cable axis, the or each lever rocking about a fulcrum having its axis substantially perpendicular to and passing substantially through the cable axis. With this arrangement, the centrifugal force on the mechanism will have the minimum effect on its function. It also has the advantage, as illustrated by the example described with reference to FIGS. 1-4 of the drawings, that the flexible tape can pass onto the core from a supply coil mounted with its axis passing through and at right angles to the cable axis so that the tape can be passed, without twisting, over a dancer pulley mounted with its axis parallel to the axis of the fulcrum, the tape being twisted through an appropriate angle for application to the cable core if necessary by suitable guides, after passing over the dancer pulley and guide rollers which generate the loop passing over the dancer pulley. Other advantages are simplicity, lightness and compactness, enabling the supply pads or drums to be mounted a minimum distance from the cable axis, the path of the material to be kept short and direct, and the centrifugal force generated by rotation of the head kept to a minimum.

What I claim as my invention is:

1. In apparatus for controlling the tension in elongated flexible material, by applying to the material a variable braking force generated in a servomechanism controlled by a sensing member moving in response to variations in the tension in the flexible material, means for generating said braking force comprising:
 (a) a lever having an input point and an output point spaced from its fulcrum,
 (b) means for applying a force to said input point to generate the braking force at said output point, comprising
  generating means for producing a substantially constant force, and
  variable transmitting means, through which the force is applied to the input point and which varies said force under the action of the tension sensing means in inverse ratio to the tension in the material, and
 (c) means coupled to said sensing member for changing the ratio of the lever by causing relative movement substantially parallel to the effective axis of an an arm of the lever between at least one of said points and the fulcrum in response to movements of the sensing member.

2. In apparatus for controlling the tension in elongated flexible material, by applying to the material a variable braking force generated in a servomechanism controlled by a sensing member moving in response to variations in the tension in the flexible material, means for generating said braking force comprising:
 (a) a first lever having an input point and an output point spaced from its fulcrum,
 (b) means for applying a force to the input point of the first lever comprising a second lever having its output point coupled to the input point of the first lever,
 (c) means for applying a substantially constant force to the input point of the second lever, and
 (d) means for changing the ratio of the first lever comprising means for simultaneously causing, under the action of the sensing member, relative movement between the input point and the fulcrum of the first lever and between the output point and fulcrum of the second lever in directions such that the ratios of the two levers are changed in the same sense.

3. Apparatus as claimed in claim 2 in which:
 (a) the input point of the first lever and the output point of the second lever are on arms of the levers which are substantially parallel to each other, and
 (b) the output force of the second lever is transmitted to the input point of the first lever by a roller device coupled to the sensing member.

4. Apparatus as claimed in claim 2 in which:
 (a) the input point of the first lever and the output point of the second lever are on arms of the levers which are substantially parallel to each other,
 (b) the output force of the second lever is transmitted to the input point of the first lever by a roller device coupled to the sensing member,
 (c) the sensing member is a pivoted member carrying the roller device at a point spaced from the pivot,
 (d) the surfaces of the two levers upon which the roller device acts are arcs of circles whose centres substantially coincide with the point about which the sensing member is pivoted, and
 (e) roller device is free to move with respect to the sensing member along a radius passing through a pivot therefor.

5. In a lapping head for applying elongated flexible material at controlled tension from a supply drum to an axially moving core, in which a variable braking force generated in a servomechanism controlled by a sensing member moving in response to variations in the tension in the flexible material between the supply drum and the core is applied to the drum, means for generating said braking force comprising:
 (a) a first lever having an input point and an output point spaced from its fulcrum,
 (b) means for applying a force to the input point of the first lever comprising a second lever having its output point coupled to the input point of the first lever,
 (c) means for applying a substantially constant force to the input point of the second lever, and
 (d) means for changing the ratio of the first lever comprising means for simultaneously causing, under the action of the sensing member, relative movement between the input point and the fulcrum of the first lever and between the output point and fulcrum of the second lever in directions such that the ratios of the two levers are changed in the same sense.

6. A lapping head as claimed in claim 5 in which said directions of movement are each parallel to the axis of the core.

7. A lapping head as claimed in claim 5 in which:
 (a) the first lever is a bell-crank lever pivoted about an axis substantially passing through and lying at right angles to the axis of the core, with the arm to which the input force is applied lying substantially parallel to the core axis, and
 (b) a member coupling the other arm of the lever to a brake for the supply drum lies substantially parallel to the axis of the core.

8. A lapping head as claimed in claim 5 in which:
 (a) both levers are bell-crank levers pivoted about an axis substantially passing through and lying at right angles to the core axis, and
 (b) a coupling member through which a substantially constant force is applied to the input arm of the second lever lies substantially parallel to the core axis.

9. A lapping head as claimed in claim 5 in which:
 (a) both levers are bell-crank levers pivoted about an axis substantially passing through and lying at right angles to the core axis,
 (b) a coupling member through which a substantially constant force is applied to the input arm of the second lever lies substantially parallel to the core axis,
 (c) the sensing member and said coupling member are each acted upon by tension springs, and
 (d) the tension springs lie parallel to each other and are provided with common tension adjusting means, by adjustment of which the tension in the flexible member can be preset.

10. A lapping head as claimed in claim 5 in which:
 (a) the input point of the first lever and the output point of the second lever are on arms of the levers which are substantially parallel to each other, and (b) the output force of the second lever is transmitted to the input point of the first lever by a roller device coupled to the sensing member.

11. In a lapping head for applying elongated flexible material at controlled tension from a supply drum to an axially moving core in which a variable braking froce is applied to the drum, said variable braking force being generated in a servomechanism controlled by a sensing member coupled to a dancer pulley about which a loop of the flexible material passes between the supply drum and the core, said sensing member moving in response to variations in the tension in the flexible material, and being acted upon by means for generating a substantially constant biasing force opposing the force exerted upon it by the tension in the flexible material, the combination of (A) means for generating said braking force comprising
  (a) a lever having an input point and output point spaced from its fulcrum,
  (b) means for applying a force to said input point to generate the braking force at said output point, and
  (c) means coupled to said sensing member for changing the ratio of the lever by causing relative movement substantially parallel to the effective axis of an arm of the lever between at least one of said points and the fulcrum in response to movement of the sensing member, and (B) means for simultaneously presetting both said means for applying force to the input point of the lever and the means for generating said biasing force to vary the controlled tension in the flexible material.

References Cited

UNITED STATES PATENTS

| | | | |
|---|---|---|---|
| 1,859,577 | 5/1932 | Armbrecht | 242—75.43 |
| 2,253,740 | 8/1941 | Van Hook | 57—18 |
| 2,462,558 | 2/1949 | Schevermann et al. | 242—75.43 |
| 2,869,684 | 1/1959 | Tarbuck | 242—75.43X |
| 3,304,705 | 2/1967 | Rathje | 57—18 |

BILLY S. TAYLOR, Primary Examiner

U.S. Cl. X.R,

242—75.42